US012686213B2

(12) United States Patent
Nagaoka et al.

(10) Patent No.: US 12,686,213 B2
(45) Date of Patent: Jul. 21, 2026

(54) LIQUID DISCHARGE HEAD

(71) Applicant: CANON KABUSHIKI KAISHA, Tokyo (JP)

(72) Inventors: Kyosuke Nagaoka, Tokyo (JP); Hirotomo Taniguchi, Saitama (JP); Roy Josephus Stephanus Derks, Venray (NL); Peter Joseph Hollands, Baarlo (NL); Hans Reinten, Velden (NL)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 18/500,516

(22) Filed: Nov. 2, 2023

(65) Prior Publication Data

US 2024/0149585 A1 May 9, 2024

(30) Foreign Application Priority Data

Nov. 4, 2022 (JP) ................................ 2022-177151

(51) Int. Cl.
*B41J 2/175* (2006.01)
*B41J 2/14* (2006.01)

(52) U.S. Cl.
CPC ........... *B41J 2/17556* (2013.01); *B41J 2/175* (2013.01); *B41J 2/14233* (2013.01)

(58) Field of Classification Search
CPC ..... B41J 2/17556; B41J 2/175; B41J 2/14233
See application file for complete search history.

(56) References Cited

U.S. PATENT DOCUMENTS

| | | | |
|---|---|---|---|
| 2017/0151805 A1 | 6/2017 | Sato | |
| 2018/0264836 A1 | 9/2018 | Yamagishi | |
| 2020/0376843 A1 * | 12/2020 | Reinten | G03F 7/2043 |
| 2021/0008889 A1 | 1/2021 | Fischer | |

FOREIGN PATENT DOCUMENTS

| | | | |
|---|---|---|---|
| CN | 112208214 | A | 1/2021 |
| JP | 2014188924 | A | 10/2014 |
| JP | 2016187948 | A | 11/2016 |
| JP | 6381133 | B2 | 8/2018 |

* cited by examiner

*Primary Examiner* — Geoffrey S Mruk
(74) *Attorney, Agent, or Firm* — Canon U.S.A., Inc. IP Division

(57) ABSTRACT

A liquid discharge head includes a discharge port through which a liquid is discharged, an element for discharging the liquid from the discharge port, a channel through which the liquid is supplied to the discharge port, and a film member that is provided so as to be in contact with the liquid in a liquid chamber in the channel. The film member has a corrugated structure in which a plurality of loop-shaped projecting portions and a plurality of loop-shaped recessed portions are alternately formed. When seen in a direction perpendicular to a plane of the film member, the corrugated structure has a loop shape having a linear portion.

15 Claims, 7 Drawing Sheets

LIQUID DISCHARGE HEAD

BACKGROUND OF THE INVENTION

Field of the Invention

The present disclosure relates to a liquid discharge head and a liquid discharge apparatus.

Description of the Related Art

A liquid discharge apparatus such as an ink jet printer generally causes a liquid discharge head to discharge a liquid such as ink to a medium such as paper. The liquid discharge head may include a damper mechanism that dampens a pressure fluctuation of ink in the liquid discharge head to stabilize the discharge of the liquid to perform a fine liquid discharge.

Japanese Patent Laid-Open No. 2014-188924 discloses a damper device that includes a flexible member having a plurality of annular regions including an annular bellows. The plurality of annular regions are concentric with each other and have different degrees of ease of deformation.

However, when the internal pressure of a liquid chamber increases due to, for example, an increase in printing speed, the damper device of Japanese Patent Laid-Open No. 2014-188924 that includes a member including the annular bellows structure does not necessarily sufficiently dampen a pressure fluctuation of the liquid.

SUMMARY OF THE INVENTION

The present disclosure that solves the above-described problem provides a liquid discharge head that can improve performance for suppressing a pressure fluctuation of a liquid in a liquid supply head.

The present disclosure that solves the above-described problem provides a liquid discharge head that includes a discharge port through which a liquid is discharged, an element for discharging the liquid from the discharge port, a channel through which the liquid is supplied to the discharge port, and a film member that is provided so as to be in contact with the liquid in a liquid chamber in the channel. The film member has a corrugated structure in which a plurality of loop-shaped projecting portions and a plurality of loop-shaped recessed portions are alternately formed. When seen in a direction perpendicular to a plane of the film member, the corrugated structure has a loop shape having a linear portion.

Further features of the present invention will become apparent from the following description of exemplary embodiments with reference to the attached drawings.

DESCRIPTION OF THE EMBODIMENTS

Hereinafter, examples of an embodiment according to the present disclosure will be described with reference to the drawings. However, the following description does not limit the scope of the present disclosure. As an example, a liquid discharge method by using drive of a piezoelectric element is used in the embodiment. However, the present disclosure can also be applied to a liquid discharge head to which a thermal method, in which a liquid is discharged by using bubbles generated by a heater element, or any of various other types of liquid discharge methods is used.

Although the liquid discharge apparatus (also simply referred to as an "apparatus" hereinafter) is in a form in which a liquid such as ink is circulated between a tank and the liquid discharge head according to the present embodiment, the flow of the liquid in the liquid discharge apparatus may be in any of other forms. For example, instead of circulating the liquid, the following form may be used: two tanks are provided on the upstream side and the down stream side of the liquid discharge head, respectively, and the liquid is caused to flow from one of the tanks to the other tank so as to cause the liquid in a pressure chamber to flow.

Figure 1:
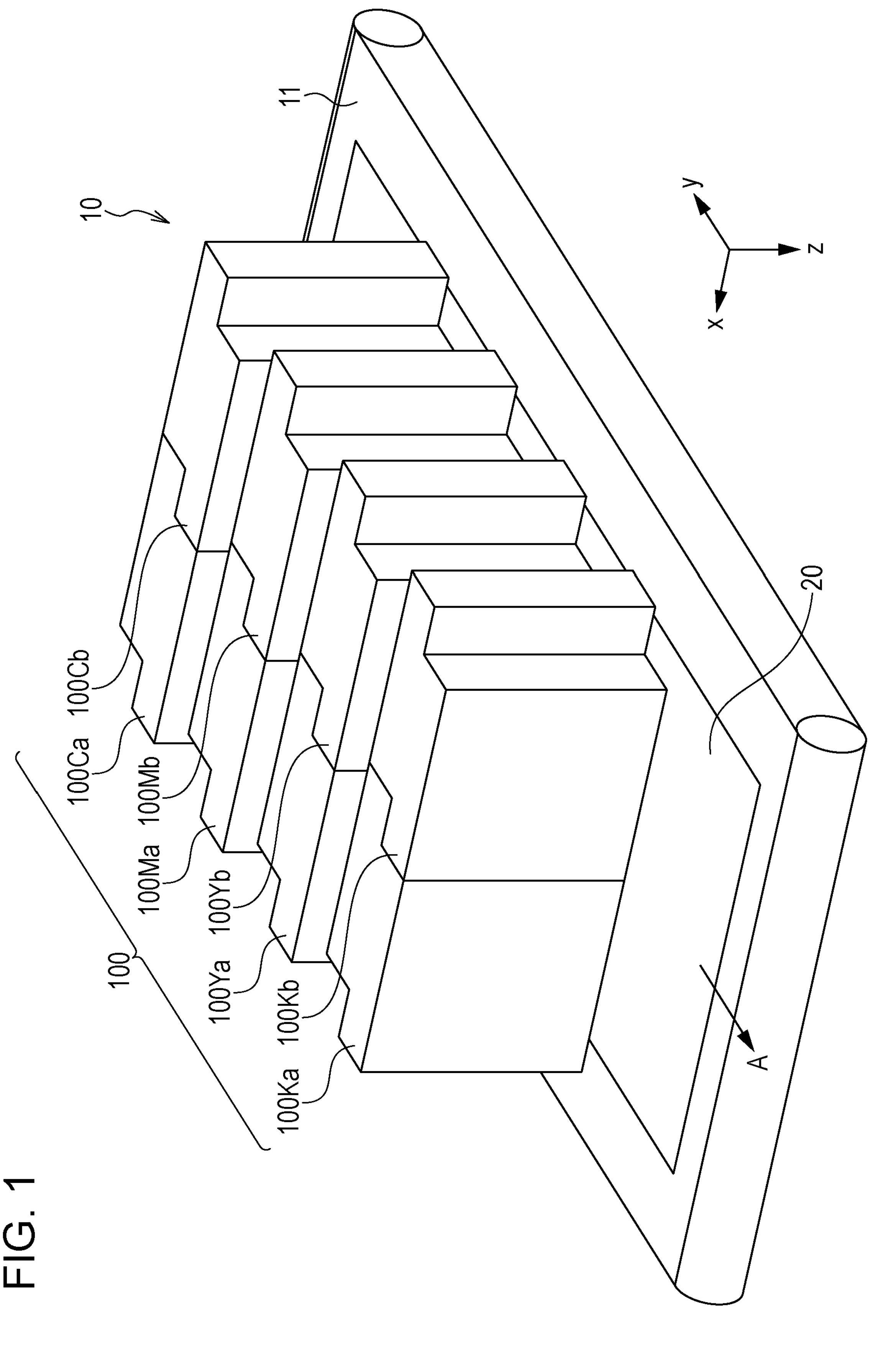
FIG. 1 is a perspective view of a liquid discharge apparatus according to an embodiment of the present disclosure.

FIG. 1 illustrates an example of a liquid discharge apparatus 10 (also simply referred to as an "apparatus" hereinafter) of a one-pass type in which nozzles are disposed through the side corresponding to a total width of a medium 20. The medium 20 is conveyed in an arrow A direction by a conveyance section 11. The liquid is discharged to the medium 20 with liquid discharge heads 100. The liquid discharge heads according to the present disclosure can be embodied in any form including the example illustrated in FIG. 1. Other forms of the liquid discharge heads are not limited.

Herein, a direction parallel to the conveyance direction A of the medium 20 is defined as a Y direction, a direction perpendicular to a conveyance direction of the heads is defined as an X direction, and a direction which is perpendicular to both the Y direction and the X direction and which extends from the liquid discharge heads 100 to the medium 20 is defined as a Z direction.

The configuration of the liquid discharge heads 100 according to the present embodiment is described.

Each of the liquid discharge heads 100 is a liquid discharge head in which an element substrate able to discharge the liquid is disposed on a support member. The liquid discharge head 100 is positioned in the apparatus 10 by using a reference member. Referring to FIG. 1, the apparatus 10 in which eight liquid discharge heads 100 (100Ka, 100Kb, 100Ya, 100Yb, 100Ma, 100Mb, 100Ca, and 100Cb) are mounted is illustrated. The liquid discharge heads 100 each include liquid connecting sections 501 and a coolant connecting section at its upper part. The liquid connecting sections 501 are connected to liquid supply sections on the apparatus 10 side, and the coolant connecting section is connected to a coolant supply section on the apparatus 10 side. Thus, liquids such as ink and a coolant are supplied to the liquid discharge head 100. The liquid supply sections on the apparatus side refer to liquid supply paths extending from a liquid container (containing section) such as an ink cartridge or an ink tank mounted in the apparatus to the liquid connecting sections 501 of the liquid discharge head 100. The liquid discharge head 100 includes a liquid discharge unit that includes the element substrate including an element such as a piezoelectric element for discharging the liquid, an electric wiring substrate connected to the liquid discharge unit, a support unit that includes a support member for supporting the liquid discharge unit, a liquid supply unit 500 that supplies the liquid to the liquid discharge unit via the support unit, and a cooling unit for cooling a drive circuit of, for example, the electric wiring substrate. Hereinafter, the configurations of the portions of the liquid discharge head 100 are described.

An apparatus main body and the element substrate are electrically connected to each other via a flexible wiring substrate and the electric wiring substrate. The electric wiring substrate is electrically connected to a control section of the apparatus main body through electric connection terminals so as to supply, to the element substrate, electric power required for a discharge drive signal and discharge. An electric connection substrate and the flexible wiring substrate are electrically connected to each other via electric connection sections. When wiring lines are converged by using an electric circuit in the electric wiring substrate, the number of the electric connection terminals can be reduced compared to the number of terminals of the element substrate. This can produce an effect of reducing the number of the electric connection sections required to be assembled or disconnected in assembling the liquid discharge head 100 to the apparatus or replacing the liquid discharge head 100.

The liquid discharge unit includes the element substrate for discharging the liquid, an element-substrate channel member through which the liquid is supplied to the element substrate, a channel member, the flexible wiring substrate electrically connected to the element substrate, and an element-substrate support member joined to a discharge surface side of the element substrate. Furthermore, the flexible wiring substrate is provided with a drive circuit substrate for driving the element of the element substrate.

The support unit includes the support member to which the liquid discharge unit is joined and a liquid supply member in which a channel through which the liquid is supplied to liquid discharge units via the support member is formed. In consideration of influence of thermal expansion caused, for example, when the temperature of the liquid is adjusted or due to variation of the environment, the materials of the support member and the liquid supply member can be the same or have respective coefficients of linear expansion close to each other. This can suppress deformation of the entirety of the support unit when thermal expansion occurs and degradation of positional accuracy of the element substrate caused by the deformation of the entirety of the support unit.

Figure 2:
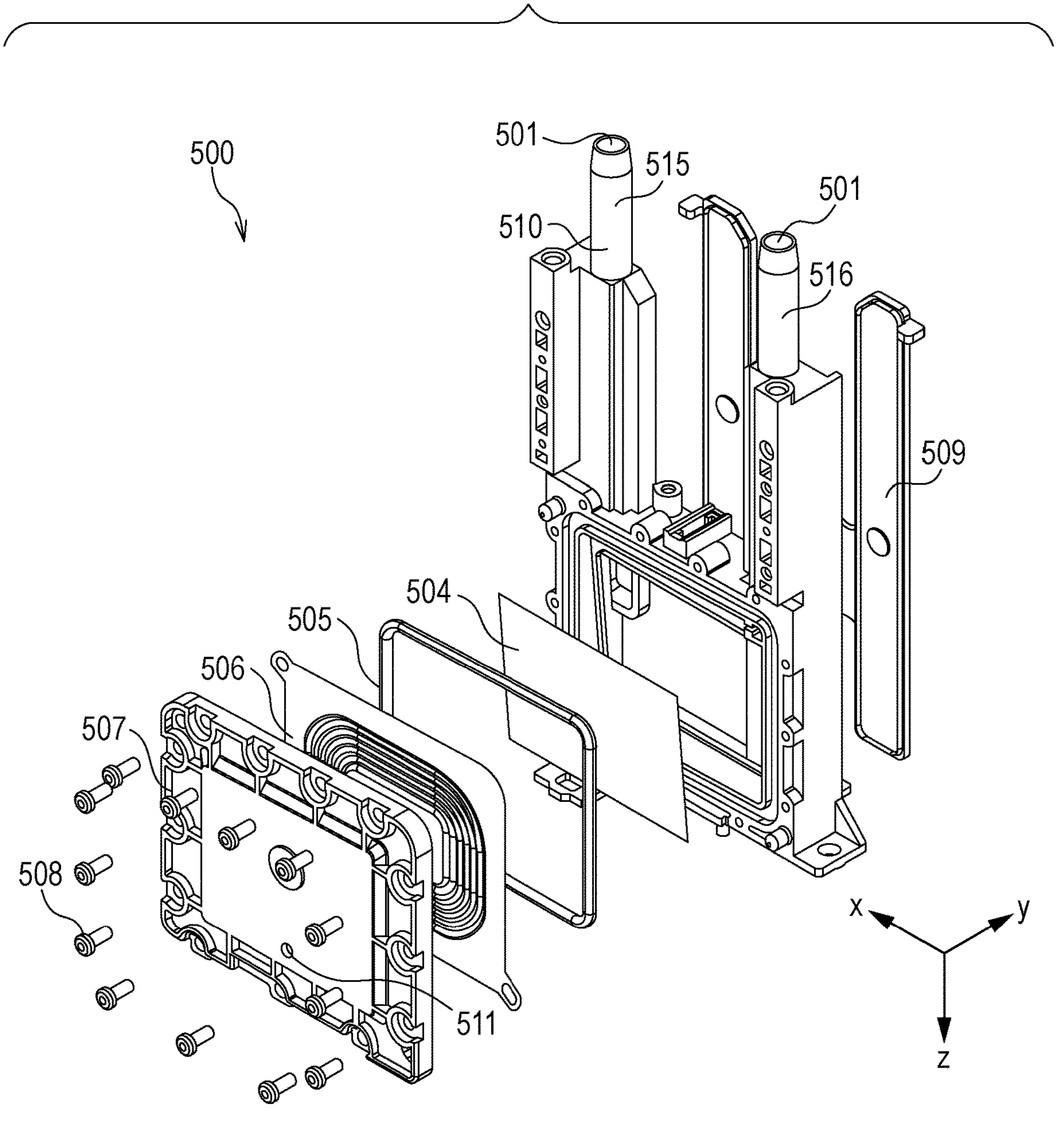
FIG. 2 is an exploded perspective view of a liquid supply unit according to the embodiment of the present disclosure.
Figure 3:
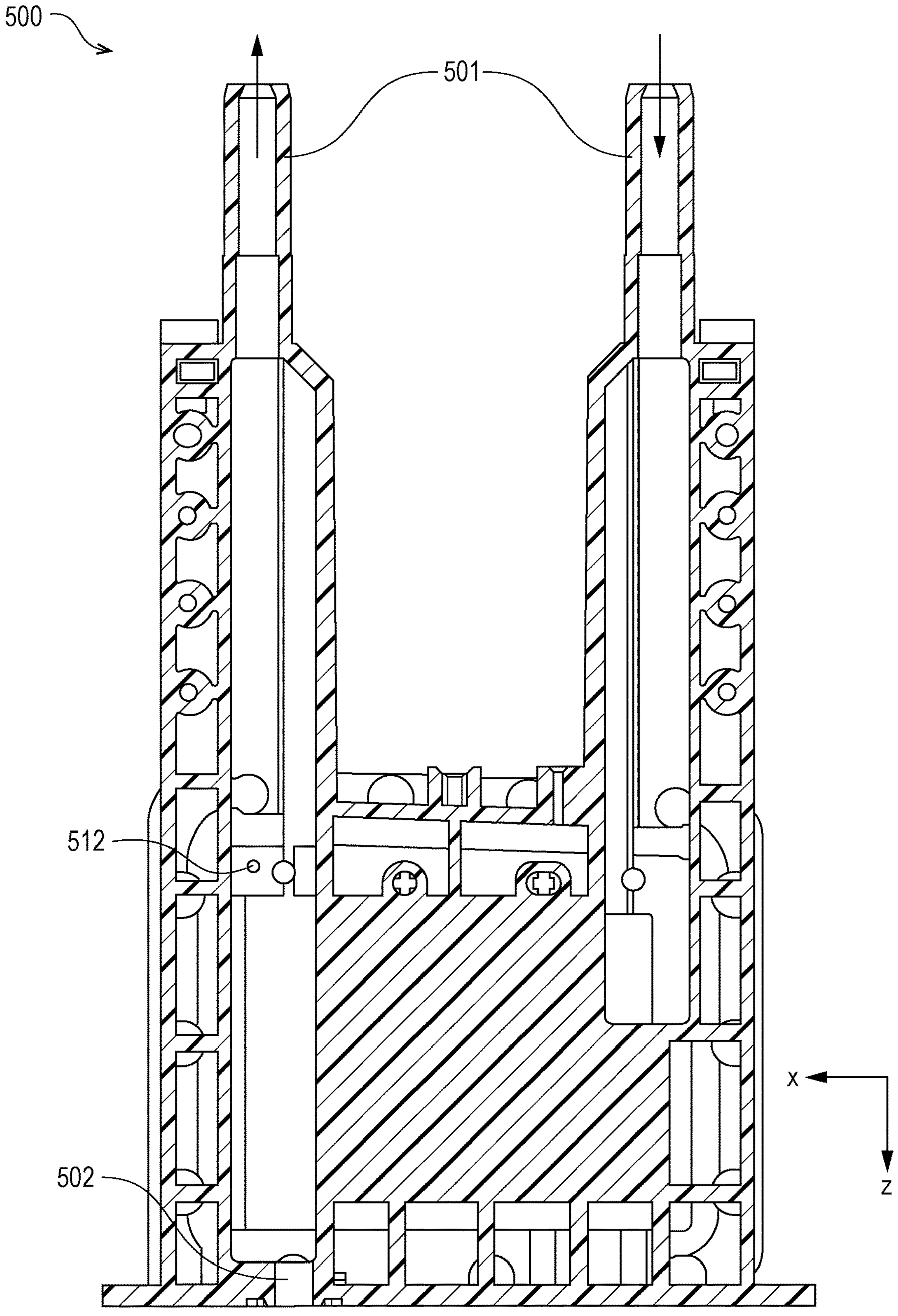
FIG. 3 is a sectional view of the liquid supply unit according to the embodiment of the present disclosure.
Figure 4:
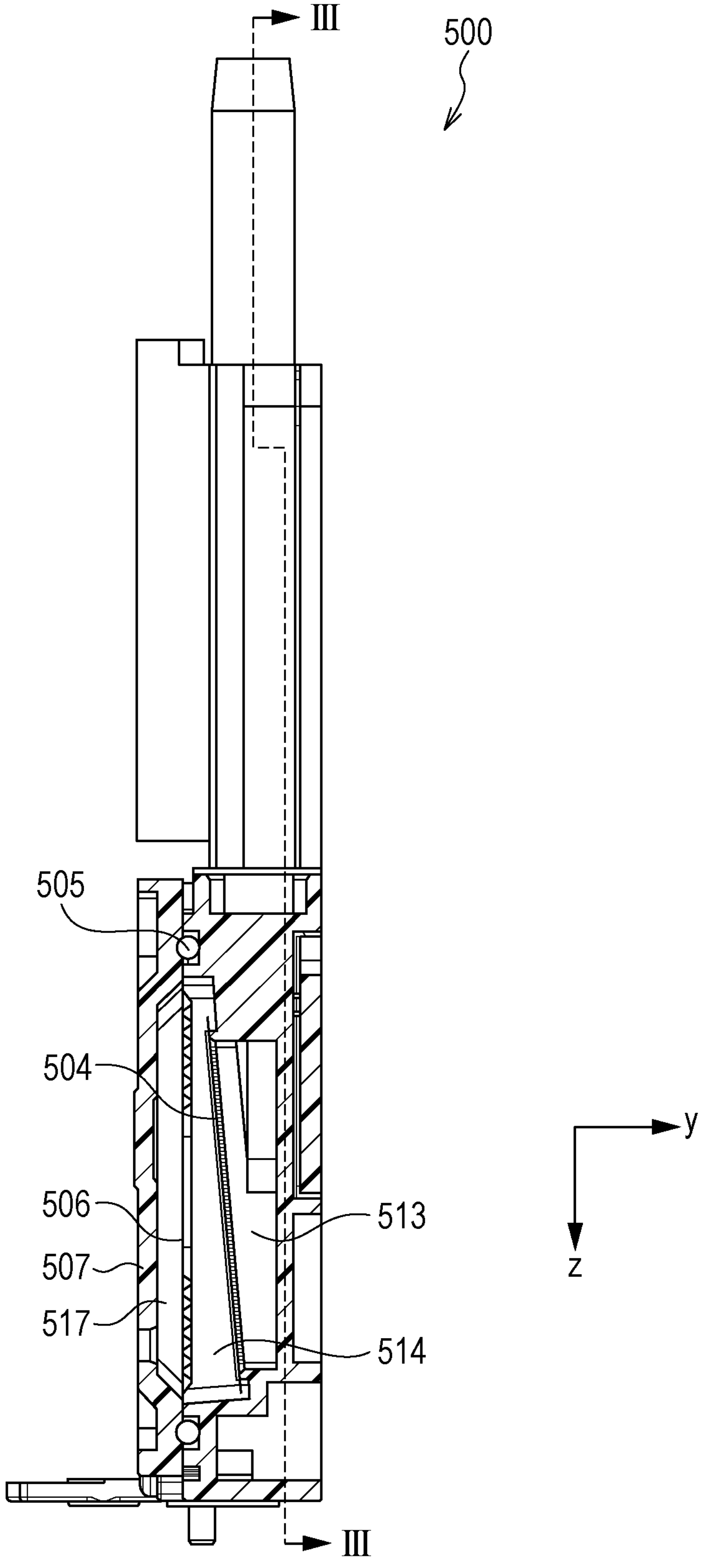
FIG. 4 is a sectional view of the liquid supply unit according to the embodiment of the present disclosure.

FIG. 2 is an exploded perspective view of the liquid supply unit 500, FIG. 3 is a sectional view of a channel forming member 510 taken along an X-Z plane taken along line III-III of FIG. 4, and FIG. 4 is a sectional view of the channel forming member 510 taken along a Y-Z plane. The directions of arrows in FIG. 3 indicate liquid flowing directions. The liquid supply unit 500 includes two liquid connecting sections 501 and is connected to a liquid supply system of the apparatus main body. Thus, the liquid is supplied from the liquid supply system of the apparatus main body to the liquid discharge head 100, and the liquid having flowed through the liquid discharge head 100 flows out (is collected) to a supply system of the apparatus main body. As described above, the liquid can circulate through a liquid supply path of the apparatus main body and a path of the liquid discharge head 100. The liquid having flowed from the apparatus main body side through a liquid connecting section 501 is supplied to the liquid discharge unit through a communicating port 502. The liquid having flowed through the communicating port 502 is supplied to the element substrate and discharged from a discharge port by using a piezoelectric element as an element that supplies energy for discharging the liquid to the discharge port.

Hereinafter, the liquid supply unit 500 is described in more detail.

A filter 504 is attached to the channel forming member 510 for the purpose of collecting foreign matter in a liquid channel. The filter 504 is provided in a space surrounded by the channel forming member 510 and a damper member 506, which will be described later. According to the present embodiment, the filter 504 is disposed so as to be inclined relative to the Z direction. This can produce an effect of reducing pressure loss in the liquid channel by reducing a head width of the liquid discharge head 100 in the Y direction and increasing an effective area of the filter 504. Although the angle of the filter 504 is inclined relative to the Z direction preferably by greater than or equal to 3° and smaller than or equal to 20° from the viewpoint of reducing the head width, the filter 504 may be disposed substantially parallel to the Z direction. The liquid of the channel forming member 510 flows from a supply channel 515 into a front liquid chamber 513, flows to a rear liquid chamber 514 through the filter 504, and flows to the support unit and the liquid discharge unit through the communicating port 502. After that, the liquid circulates in the element substrate and connected from the communicating port 502 to the liquid supply system of the apparatus main body through a flow-out channel 516. As illustrated in FIG. 3, a bypass channel 512 is provided in the channel forming member 510. The bypass channel 512 is a channel that directly connects the rear liquid chamber 514 and the flow-out channel 516 to each other and is provided for removing air retained in the rear liquid chamber 514. A channel that connects the front liquid chamber 513 and the flow-out channel 516 may be provided for the same purpose. A channel cover member 509 is attached to the channel forming member 510. The supply channel 515 and the flow-out channel 516 are formed by the channel forming member 510 and the channel cover member 509. A method of attaching the channel cover member 509 includes, but not limited to, joining by ultrasonic welding. The channel forming member 510 and the channel cover member 509 may be integrally formed.

The channel forming member 510 is provided with the damper member 506 having a film shape. The damper member 506 together with a cover member 507 is secured to the channel forming member 510 by screws 508. A contact portion between the channel forming member 510 and the damper member 506 is sealed with an elastic member 505.

The damper member 506, which is a film member having a film shape, is a deforming member configured to deform in accordance with a pressure fluctuation in the liquid chambers of the channel forming member 510. The damper member 506 changes the volumes of the liquid chambers (the front liquid chamber 513 and the rear liquid chamber 514) to dampen the pressure fluctuation of the liquid in the channel. Operation of the damper member 506 will be described later.

From the viewpoint of strength and dampening performance, the film thickness of the damper member 506 is preferably greater than or equal to 10 μm and smaller than or equal to 500 μm, and more preferably greater than or equal to 30 μm and smaller than or equal to 300 μm.

Figure 5A:
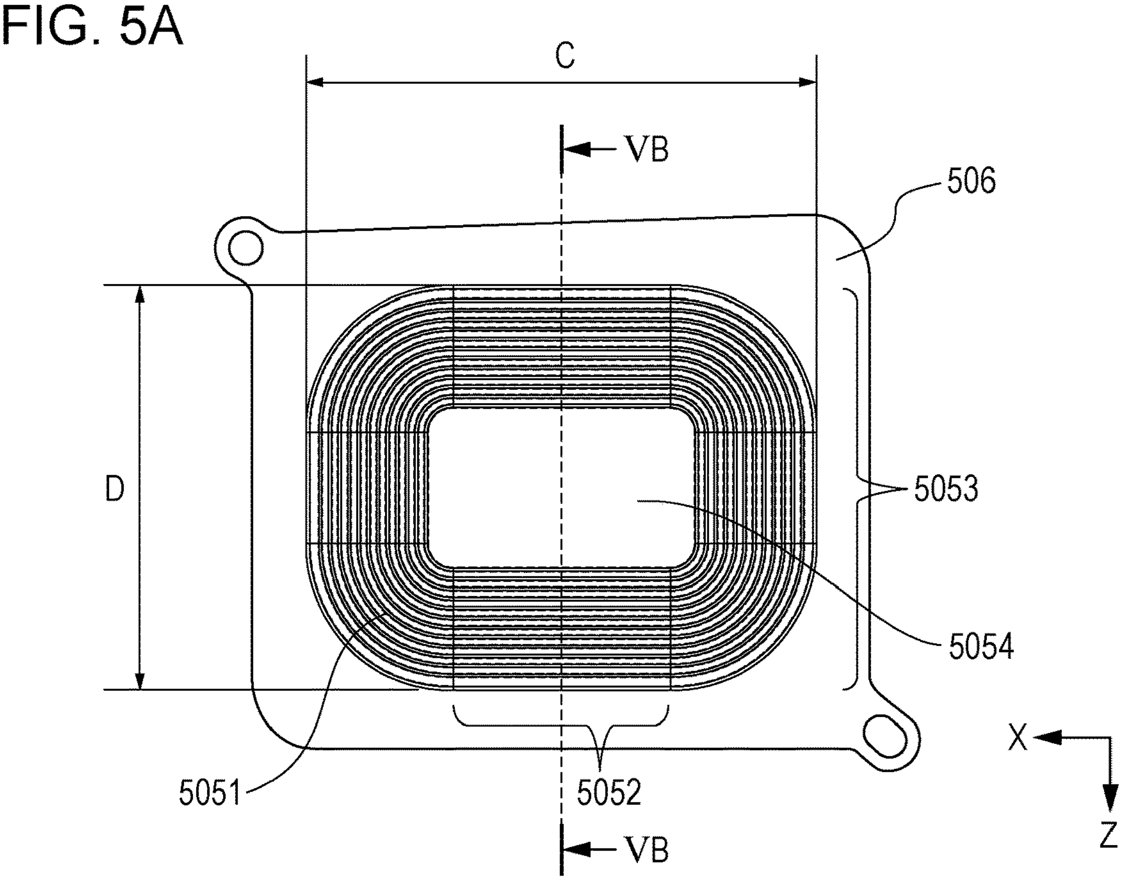
FIG. 5A is a front view of a damper member according to the embodiment of the present disclosure.
Figure 5B:
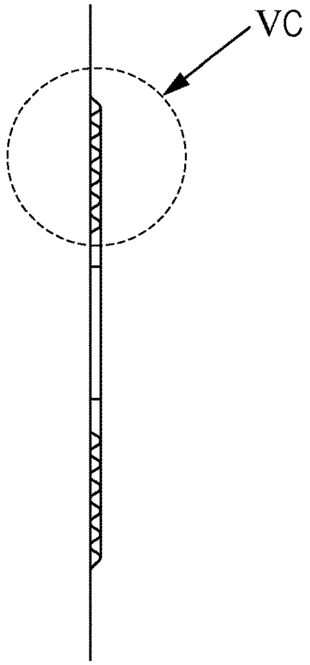
FIG. 5B is a sectional view taken along line VB-VB of FIG. 5A.
Figure 5C:
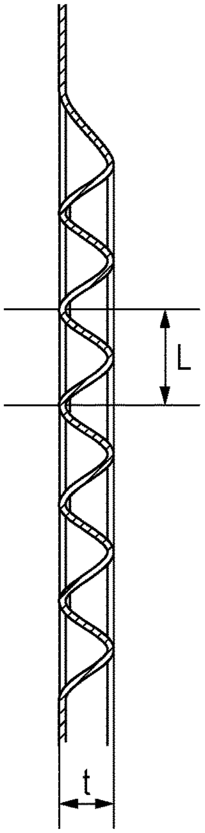
FIG. 5C is an enlarged sectional view of part VC of FIG. 5B.

FIG. 5A is a front view of the damper member 506, FIG. 5B is a sectional view of the damper member 506 taken along line VB-VB, and FIG. 5C is an enlarged view of part VC in FIG. 5B. As illustrated in FIG. 5A, the damper member 506 includes a corrugated structure 5053 in which a plurality of loop-shaped projecting portions and a plurality of loop-shaped recessed portions are alternately formed. Each of the loop-shaped projecting portions and loop-shaped recessed portions may be considered loop-shaped, or substantially loop-shaped, in the sense that they are ring-like, i.e. a continuous structure, but not strictly limited to a circular shape. Since the corrugated structure is formed from the loop-shaped projecting portions and loop-shaped recessed portions may also be considered loop-shaped, or substantially loop-shaped, in the same sense, i.e. a continuous structure which is ring-like but that is not limited to a circular shape. The projection portions and recessed portions may be considered projecting from and recessed in one side of the film. When seen in a direction perpendicular to the plane of damper member 506, the corrugated structure 5053 has a loop shape having linear portions 5052 and curved portions 5051. Both the projecting portions and recessed portions have linear portions and curved portions. The linear portions and curved portions form a substantially loop shape. A non-exhaustive list of examples of substantially loop shapes include a rectangle with rounded corners, a triangle with rounded corners, a rectangle with semi-circle ends (also known as pill-shaped or a stadium), and an egg-shape. According to the present embodiment, the shape of the corrugated structure 5053 is a rounded rectangular having four curved portions 5051 and four linear portions 5052. The linear portions 5052 refer to regions where the plurality of projecting portions and the plurality of recessed portions are arranged in parallel in the corrugated structure 5053.

Figure 6A:
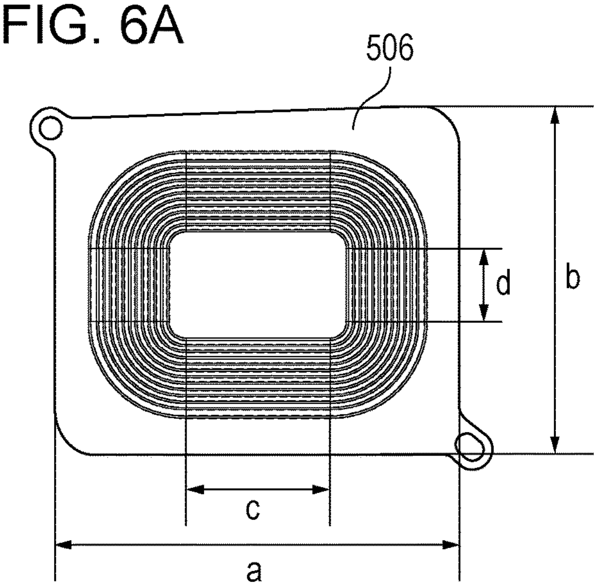
FIGS. 6A to 6F are front views of damper members according to exemplary embodiments of the present disclosure.

In FIGS. 5A to 5C and FIGS. 6A to 6F, which will be described later, boundaries between the linear portions 5052 and the curved portions 5051 are indicated by lines for convenience. The corrugated structure 5053 can be formed into the damper member 506 by, for example, thermoforming. When the damper member 506 is deformed by the pressure of the liquid in the liquid chambers, the volume of the liquid chambers changes due to the deformation of the corrugated structure 5053, and thereby the pressure fluctuation of the liquid can be dampened. The dampening performance is represented by a volume change per unit pressure (compliance). As the volume change per unit pressure increases, that is, ease of deformation of the corrugated structure increases, the dampening performance becomes higher. In contrast, as illustrated in FIGS. 7A and 7B, when the corrugated structure 5053 has a circular shape without a linear portion, as the absolute value of the pressure in the liquid chambers increase, the amount of change in the corrugated structure 5053 reduces due to an influence of high stiffness of the circle. Thus, the compliance is also reduced. However, according to the present disclosure, since the loop-shaped corrugated structure has the linear portions 5052, the damper member 506 with a high compliance is provided in which the amount of change in the corrugated structure 5053 is not reduced even when the absolute value of the pressure in the liquid chambers increases.

Regarding the size of the loop-shaped corrugated structure 5053 (a width C and a width D illustrated in FIG. 5A), the length of the short side is preferably greater than or equal to 15 mm from the viewpoint of obtaining an adequate compliance. The length of the short side and the length the long side may be equal to each other as illustrated in FIG. 6C. Also, similarly from the viewpoint of the compliance, the length of the linear portions 5052 is preferably greater than or equal to 2.0 mm.

Although the corrugated structure 5053 has a rounded rectangular shape in the damper member 506 illustrated in FIG. 5A, the loop-shaped corrugated structure 5053 may have another shape as long as the linear portion 5052 is provided. For example, the corrugated structure 5053 may have a shape having the linear portions 5052 in a single direction in the plane as illustrated in FIG. 6E. Alternatively, the corrugated structure 5053 may have a rounded triangular shape having three curved portions 5051 and three linear portions 5052 as illustrated in FIG. 6F. Alternatively, the corrugated structure 5053 may be configured only with the linear portions 5052 without including the curved portions 5051. However, among various shapes of loop-shaped corrugated structures 5053, the corrugated structure can have a rounded rectangular shape which has the plurality of curved portions 5051 and the plurality of linear portions 5052 and in which some of the linear portions 5052 extend in the X direction and the other linear portions 5052 extend in the Z direction as illustrated in FIG. 5A because a particularly large compliance can be obtained. In particular, when the corrugated structure 5053 is formed in the entirety of the surface of the damper member 506 as illustrated in FIGS. 5A, 6A and 6D, the proportion of a flat surface existing outside the corrugated structure reduces. In this case, reduction of the compliance due to buckling of a flat surface portion existing outside occurring when a pressure changes in the liquid chambers is prevented. This allows obtaining of a more stable dampening effect, and accordingly, the damper member 506 having the shape illustrated in FIG. 5A, 6A, or 6D can be used. When the damper member 506 has a substantially rectangular shape and the corrugated structure 5053 has a rounded rectangular shape, in order to reduce the proportion of the flat surface existing outside the corrugated structure 5053, the ratio, in length, of the width of the corrugated structure 5053 to the side of the damper member 506 (C/c and D/d, see FIGS. 5A and 6A) is preferably greater than or equal to 0.7, and more preferably, greater than or equal to 0.75.

As illustrated in FIG. 5C, when seen in a direction parallel to the plane of the damper member 506, the corrugated structure 5053 has the plurality of recessed portions and the plurality of projecting portions. In other words, the corrugated structure 5053 has a bellows shape in which folded down portions and folded up portions are alternately formed. From the viewpoint of formability and the compliance, a height t of the corrugated structure 5053 (a height difference between the recessed portions and the projecting portions of the corrugation when seen in the direction parallel to the plane of the damper member) is preferably greater than or equal to 0.2 mm and smaller than or equal to 3.0 mm, and more preferably, greater than or equal to 0.5 mm and smaller than or equal to 2.5 mm. Similarly from the viewpoint of the compliance, a pitch L of the corrugated structure 5053 is preferably greater than or equal to 0.5 mm and smaller than or equal to 5.0 mm. The corrugated structure 5053 is not necessarily formed by repeatedly making the same sectional shape. Furthermore, the number of the upward folds in the corrugated structure 5053 is preferably greater than or equal to three. Referring to FIG. 5A, a flat portion 5054 is provided in a central portion of the loop-shaped corrugated structure 5053 in the damper member 506. However, the damper member 506 may have a shape in which no flat portion 5054 is provided and the corrugated structure 5053 extends entirely to the center of the loop-shaped structure.

Hereinafter, a deformation behavior of the damper member 506 due to the pressure fluctuation of the liquid in the liquid chambers is described.

When the pressure in the liquid chambers reduces, the damper member deforms in the Y direction in the drawings so as to reduce the volume of the liquid chambers. In contrast, when the pressure in the liquid chambers increases, the damper member 506 deforms in a direction of the cover member 507, which is a −Y direction in the drawings, so as to increase the volume of the liquid chambers (see FIG. 2). The cover member 507 has a recessed portion 517 so as to allow the damper member 506 to deform in the −Y direction. That is, as illustrated in FIG. 4, when seen in the direction parallel to the plane of the damper member 506, the cover member 507 has a sectional shape that projects toward a surface of the cover member 507 opposite from the damper member 506. Furthermore, the cover member 507 has a communicating port 511 to allow a space between the cover member 507 and the damper member 506 to communicate with the atmosphere so that the deformation of the damper member 506 in accordance with the pressure fluctuation in the liquid chambers is not prevented (see FIG. 2).

As the material of the damper member 506, any of a various resin materials such as polyethylene (PE), polypropylene (PP), polyethylene terephthalate (PET), polycarbonate (PC), polystyrene (PS), polyetherether ketone (PEEK), and polyimide (PI) can be used. From the viewpoints of water resistance against a liquid such as ink, robustness for displacement of the loop-shaped corrugated structure 5053 against the pressure, and the moldability of the loop-shaped corrugated structure 5053, polyimide or polyetherether ketone can be used.

EXEMPLARY EMBODIMENTS

Hereinafter, exemplary embodiments of the present disclosure are presented to further describe the present disclosure in detail. However, the present disclosure is not limited to these.

In the exemplary embodiments of the present disclosure, the dampening performance of the damper member 506 including different corrugated structures 5053 is evaluated with the liquid supply unit 500 illustrated in FIG. 2.

Exemplary Embodiment 1

The damper member 506 having the shape illustrated in FIG. 6A is used. The outer dimensions of the damper member 506 are as follows: a length a in the X direction is 50 mm; and a length b in the Z direction is 40 mm. The dimensions of the loop-shaped corrugated structure 5053 are as follows: the length C in the X direction is 40 mm; the length D in the Z direction is 33 mm (see FIG. 5A); the length c of the linear portions 5052 in the X direction is 17 mm; and the length d in the Z direction is 8 mm. In the sectional shape of the corrugated structure 5053, the depth t is 0.8 mm, the pitch L is 1.5 mm, and six upward folds of the corrugated shape are provided. The liquid supply unit 500 is created with a polyimide material 75RN (thickness of 75 μm) made by UBE Corporation used as the material of the damper member 506.

Exemplary Embodiment 2

Figure 6B:
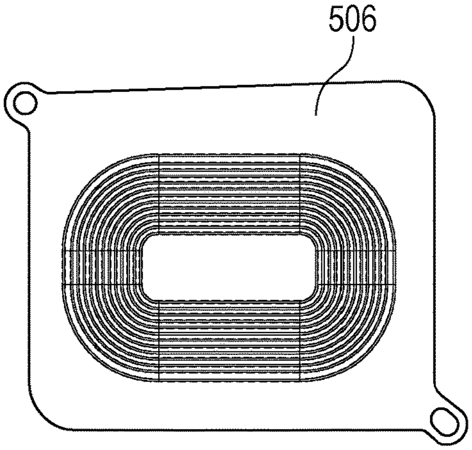
Figure 6C:
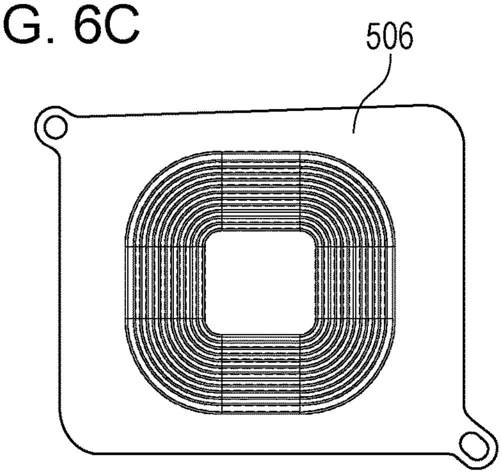
Figure 6D:
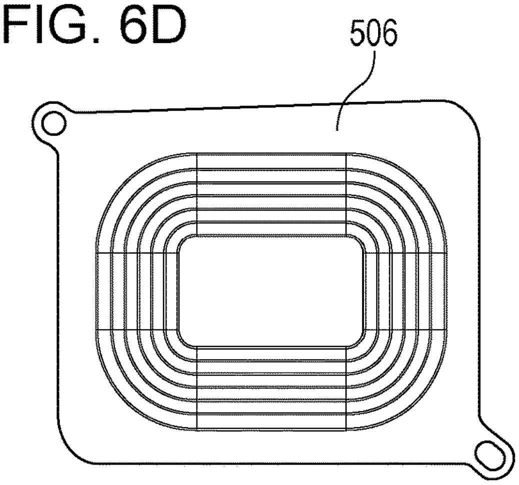
Figure 6E:
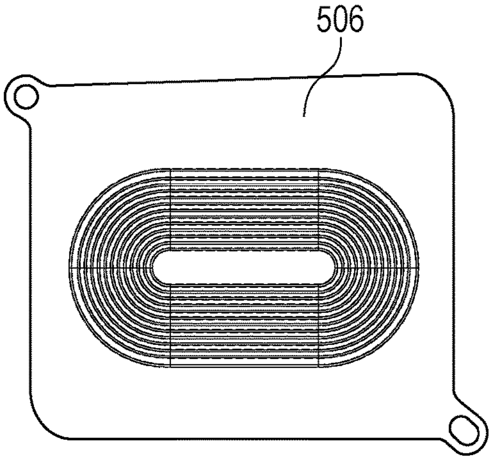
Figure 6F:
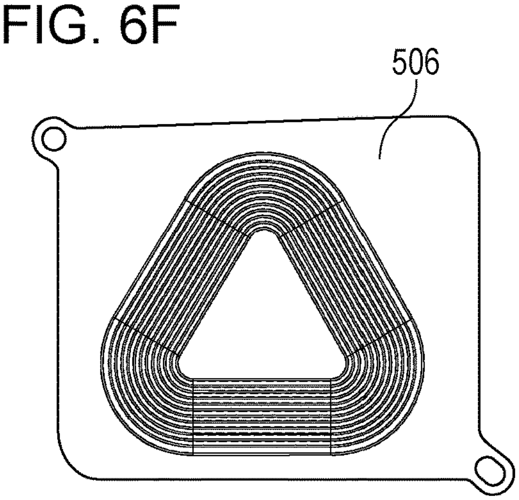
Figure 7A:
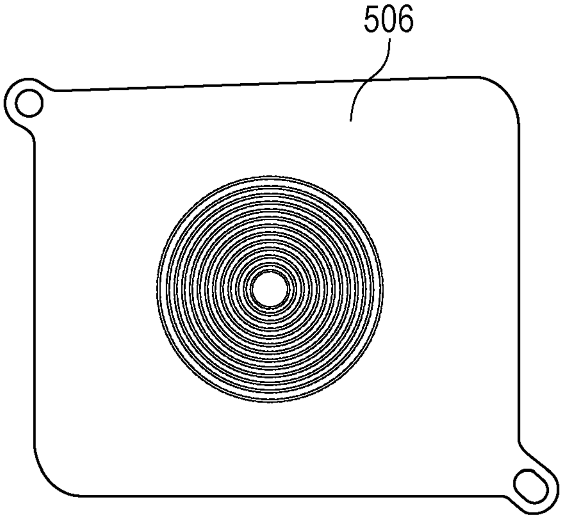
FIGS. 7A and 7B are front views of damper members according to comparative examples of the present disclosure.
Figure 7B:
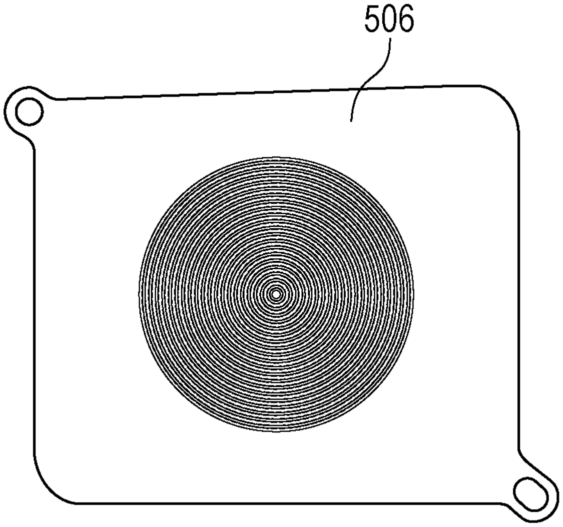

The liquid supply unit 500 is created with the damper member 506 having the shape illustrated in FIG. 6B. This damper member 506 is similar to that of exemplary embodiment 1 except for that, out of the dimensions of the loop-shaped corrugated structure 5053, the linear portion d is 4 mm and the length D in the Z direction is 29 mm.

Exemplary Embodiment 3

The liquid supply unit 500 is created with the damper member 506 having the shape illustrated in FIG. 6C. This damper member 506 is similar to that of exemplary embodiment 1 except for that, out of the dimensions of the loop-shaped corrugated structure 5053, the linear portion c is 8 mm and the length C in the X direction is 31 mm.

Exemplary Embodiment 4

The liquid supply unit 500 is created similarly to that of exemplary embodiment 1 except for that, in the sectional shape of the corrugated structure 5053, the depth t is 0.5 mm.

Exemplary Embodiment 5

The liquid supply unit 500 is created similarly to that of exemplary embodiment 1 except for that, in the sectional shape of the corrugated structure 5053, the depth t is 2.5 mm.

Exemplary Embodiment 6

The liquid supply unit 500 is created with the damper member 506 having the shape illustrated in FIG. 6D. This damper member 506 is similar to that of exemplary embodiment 1 except for that, in the sectional shape of the corrugated portion, the pitch L is 3.0 mm.

Exemplary Embodiment 7

The liquid supply unit 500 is created with the damper member 506 having the shape illustrated in FIG. 6E. This damper member 506 is similar to that of exemplary embodiment 1 except for that, out of the dimensions of the loop-shaped corrugated structure 5053, the linear portion d is 0 mm and the length D in the Z direction is 25 mm, so that the loop-shaped corrugated structure 5053 is formed without the linear portions d of FIG. 6A.

Exemplary Embodiment 8

The damper member 506 having the shape illustrated in FIG. 6F is used. The liquid supply unit 500 is created similarly to that of exemplary embodiment 1 except for that the loop-shaped corrugated structure 5053 has a rounded triangular shape with three linear portions having a length of 15 mm.

Comparative Example 1

The damper member 506 having the shape illustrated in FIG. 7A is used. The liquid supply unit 500 is created similarly to that of exemplary embodiment 1 except for that the loop-shaped corrugated structure 5053 has a circular shape without a linear portion, and the number of the upward folds of the corrugation is six.

Comparative Example 2

The damper member 506 having the shape illustrated in FIG. 7B is used. The liquid supply unit 500 is created similarly to that of exemplary embodiment 1 except for that the loop-shaped corrugated structure 5053 has a circular shape without a linear portion, and the number of the upward folds of the corrugation is nine.

Evaluation of Dampening Effect

The liquid supply units 500 created in exemplary embodiments 1 to 8 and comparative examples 1 and 2 are filled with the liquid to evaluate the dampening effect by the following standards. Results of the evaluation are listed in Table 1. The compliance is measured in the following method. First, the amount of the liquid injected into the liquid supply unit 500 is gradually increased while the internal pressure of the liquid chambers in the liquid supply unit 500 is measured. After an internal pressure (Pa) at which the compliance is wanted to be measured has been reached, the liquid is further injected by 0.1 ml, and the volume of the injected liquid (0.1 ml) is divided by the amount of change in the internal pressure (Pa) to calculate the compliance ($mm^3/Pa$). The compliance is calculated at two levels of the internal pressure, 1000 Pa and 3000 Pa. The evaluation indicated in Table 1 is determined based on the following standards.

A: The compliance is greater than or equal to 0.3 $mm^3/Pa$ when the internal pressure of the liquid chambers of the liquid supply unit 500 is 1000 Pa and 3000 Pa.

B: The compliance is greater than or equal to 0.2 $mm^3/Pa$ when the internal pressure of the liquid chambers of the liquid supply unit 500 is 1000 Pa, and the compliance is greater than or equal to 0.2 $mm^3/Pa$ and smaller than 0.3 $mm^3/Pa$ when the internal pressure of the liquid chambers of the liquid supply unit 500 is 3000 Pa.

C: The compliance is greater than or equal to 0.2 $mm^3/Pa$ when the internal pressure of the liquid chambers of the liquid supply unit 500 is 1000 Pa, and the compliance is smaller than 0.2 $mm^3/Pa$ when the internal pressure of the liquid chambers of the liquid supply unit 500 is 3000 Pa.

TABLE 1

| | Shape of damper member | Evaluation |
|---|---|---|
| Exemplary Embodiment 1 | FIG. 6A | A |
| Exemplary Embodiment 2 | FIG. 6B | A |
| Exemplary Embodiment 3 | FIG. 6C | A |
| Exemplary Embodiment 4 | FIG. 6A | A |
| Exemplary Embodiment 5 | FIG. 6A | A |
| Exemplary Embodiment 6 | FIG. 6D | A |
| Exemplary Embodiment 7 | FIG. 6E | B |
| Exemplary Embodiment 8 | FIG. 6F | B |
| Comparative Example 1 | FIG. 7A | C |
| Comparative Example 2 | FIG. 7B | C |

With exemplary embodiments 1 to 8 in which the damper member 506 including the loop-shaped corrugated structure 5053 having the linear portions 5052 is provided, a high compliance is obtained at both the internal pressures of 1000 Pa and 3000 Pa. Particularly with exemplary embodiments 1 to 6 in which the loop-shaped corrugated structure 5053 has a rounded rectangular shape having four linear portions 5052, a yet higher compliance is obtained. In contrast, with comparative examples 1 and 2 in which the loop-shaped corrugated structure 5053 has a circular shape without a linear portion 5052, in particular at a high pressure of 3000 Pa, the compliance indicates a lower value than that in exemplary embodiments 1 to 8.

According to the present disclosure, the liquid discharge head and the film member that can improve the performance for suppressing the pressure fluctuation of the liquid in the liquid supply head can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions The present disclosure includes the following numbered configurations.

1. A liquid discharge head comprising:
   - a discharge port through which a liquid is discharged;
   - an element for discharging the liquid from the discharge port;
   - a channel through which the liquid is supplied to the discharge port; and
   - a film member (506) that is provided so as to be in contact with the liquid in a liquid chamber in the channel,
   - wherein the film member (506) has a corrugated structure in which a plurality of loop-shaped projecting portions and a plurality of loop-shaped recessed portions are alternately formed, and
   - wherein, when seen in a direction perpendicular to a plane of the film member (506), the corrugated structure has a loop shape having at least one linear portion.
2. A liquid discharge head comprising:
   - a discharge port through which a liquid is discharged;
   - an element for discharging the liquid from the discharge port;
   - a channel through which the liquid is supplied to the discharge port; and
   - a deforming member (506) that is provided so as to be in contact with the liquid in a liquid chamber provided in the channel and that deforms, in accordance with a pressure fluctuation of the liquid in the liquid chamber so as to change a volume of the liquid chamber,
   - wherein, in the deforming member (506), a plurality of loop-shaped projecting portions and a plurality of loop-shaped recessed portions that deform in accordance with the pressure fluctuation are alternately formed, and
   - wherein, when seen in a direction perpendicular to a surface in which the projecting portions and the recessed portions are formed, loop shapes of the projecting portions and the recessed portions have linear portions.
3. A liquid supply unit (500) for use in a liquid discharge head of a printer, the unit comprising:
   - a channel forming member (510) defining a liquid chamber, the liquid chamber comprising a front liquid chamber and a rear liquid chamber, the channel forming member including a supply channel (515) for supplying liquid to the front liquid chamber and a communicating port (502) for liquid to flow from the liquid supply unit to the another unit of the printer;
   - a film member (506) provided between the front liquid chamber and the rear liquid chamber,
     - wherein the film member (506) has a corrugated structure (5053) in which a plurality of projecting portions extend from a surface of the film member and recessed portions disposed between the projecting portions, and wherein, when seen in a direction perpendicular to a plane of the film member (506), the corrugated structure has a substantially loop shape having at least one linear portion (5052).

4. A reversibly deformable damper member (506) for use in reducing pressure fluctuations in a liquid channel within a printer, the deformable damper member comprising:

a film body; and a corrugated structure (5053) disposed on or in the film member comprising a plurality of projection portions extending from a surface of the deformable film and recessed portions disposed between the projection portions, wherein, when seen in a direction perpendicular to a plane of the reversibly deformable damper member, the corrugated structure has a substantially loop shape having at least one linear portion (5052) and at least one rounded corner (5051).

This application claims the benefit of Japanese Patent Application No. 2022-177151, filed Nov. 4, 2022, which is hereby incorporated by reference herein in its entirety.

What is claimed is:

1. A liquid discharge head comprising:

a discharge port through which a liquid is discharged;

an element for discharging the liquid from the discharge port;

a channel through which the liquid is supplied to the discharge port; and a film member that is provided so as to be in contact with the liquid in a liquid chamber in the channel, wherein the film member has a corrugated structure in which a plurality of loop-shaped projecting portions and a plurality of loop-shaped recessed portions are alternately formed, and wherein, when seen in a direction perpendicular to a plane of the film member, the corrugated structure has a loop shape having at least one linear portion.

2. The liquid discharge head according to claim 1, further comprising:

an element substrate including the discharge port and the element; and a liquid supply unit including the film member and a channel forming member that includes the channel and the liquid chamber.

3. The liquid discharge head according to claim 2, wherein the film member defines a part of a surface of the liquid chamber, and wherein, when a volume of the liquid chamber increases, a surface of the film member surrounded by the corrugated structure moves in a direction separating from a surface of the liquid chamber facing the film member, and, when the volume of the liquid chamber reduces, the surface of the film member surrounded by the corrugated structure moves in a direction approaching the surface of the liquid chamber.

4. The liquid discharge head according to claim 2, wherein the film member is interposed between the channel forming member and a cover member.

5. The liquid discharge head according to claim 4, wherein the cover member has a communicating port for communication of a space between the film member and the cover member with an atmosphere.

6. The liquid discharge head according to claim 4, wherein, when seen in a direction parallel to the plane of the film member, the cover member has a sectional shape that projects toward a surface of the cover member opposite from the film member.

7. The liquid discharge head according to claim 2, wherein the channel forming member includes, in the liquid chamber surrounded by the channel forming member and the film member, a filter that collects foreign matter in the channel.

8. The liquid discharge head according to claim 2, wherein the channel forming member includes a supply channel through which the liquid is supplied to the discharge port and a flow-out channel through which the liquid flows out from the discharge port, and wherein the liquid in the liquid chamber circulates.

9. The liquid discharge head according to claim 8, wherein the channel forming member further includes a bypass channel that directly connects the supply channel and the flow-out channel to each other.

10. The liquid discharge head according to claim 2, wherein the channel includes a supply channel through which the liquid is supplied to the element substrate and a flow-out channel through which the liquid flows out from the discharge port, and wherein the liquid circulates between an inside and an outside of the element substrate.

11. The liquid discharge head according to claim 1, wherein the film member is formed of polyimide or polyetherether ketone.

12. The liquid discharge head according to claim 1, wherein the at least one linear portion includes four linear portions, and wherein, when seen in the direction perpendicular to the plane of the film member, the corrugated structure has a rounded rectangular shape having the four linear portions and four curved portions.

13. The liquid discharge head according to claim 1, wherein, when seen in a direction parallel to the plane of the film member, a height of the corrugated structure is greater than or equal to 0.2 mm and smaller than or equal to 3.0 mm.

14. The liquid discharge head according to claim 1, wherein the element is a piezoelectric element.

15. A liquid discharge apparatus comprising:

a liquid discharge head including a containing section that contains a liquid, a discharge port to which the liquid is supplied from the containing section and through which the liquid is discharged, an element for discharging the liquid from the discharge port, a channel through which the liquid is supplied to the discharge port, and a film member that is provided so as to be in contact with the liquid in a liquid chamber in the channel, wherein the film member has a corrugated structure in which a plurality of loop-shaped projecting portions and a plurality of loop-shaped recessed portions are alternately formed, and wherein, when seen in a direction perpendicular to a plane of the film member, the corrugated structure has a loop shape having a linear portion.

* * * * *